United States Patent [19]

Ries

[11] Patent Number: 5,060,412
[45] Date of Patent: Oct. 29, 1991

[54] CASTING ROD

[76] Inventor: Robert A. Ries, Rte. 3, Box 296, Buffalo, Mo. 65622

[21] Appl. No.: 474,517

[22] Filed: Feb. 2, 1990

[51] Int. Cl.$^5$ .......................................... A01K 91/02
[52] U.S. Cl. ...................................................... 43/19
[58] Field of Search ........................... 43/18.1, 19, 25

[56] References Cited

U.S. PATENT DOCUMENTS

| | | | |
|---|---|---|---|
| 1,226,162 | 5/1917 | Attula | 43/19 |
| 2,593,885 | 4/1952 | James | 43/25 |
| 2,804,711 | 9/1957 | Kozar | 43/25 |
| 3,165,855 | 1/1965 | Stephenson | 43/19 |
| 3,270,457 | 9/1966 | Austin | 43/18.1 |
| 3,436,858 | 4/1969 | Shaffer | 43/19 |
| 3,525,174 | 8/1970 | Worsham | 43/19 |
| 3,579,896 | 5/1971 | Flotlorp | 43/19 |
| 4,051,617 | 10/1977 | Dorph | 43/18.1 |

Primary Examiner—Kurt Rowan
Assistant Examiner—James Miner
Attorney, Agent, or Firm—Litman, McMahon & Brown

[57] ABSTRACT

A casting or fishing rod includes a handle assembly and a rod assembly. The rod assembly is rotatably connected to the handle assembly by a hinge and is swingable through an arc of movement between aligned and skewed positions with respect thereto. A line release mechanism includes fixed and movable jaws mounted on the rod assembly and an actuator mounted on the handle assembly for automatically actuating the movable jaw to release a line passing through the line release mechanism upon completing a casting swing whereby the rod assembly is swung from its skewed position to its aligned position.

8 Claims, 3 Drawing Sheets

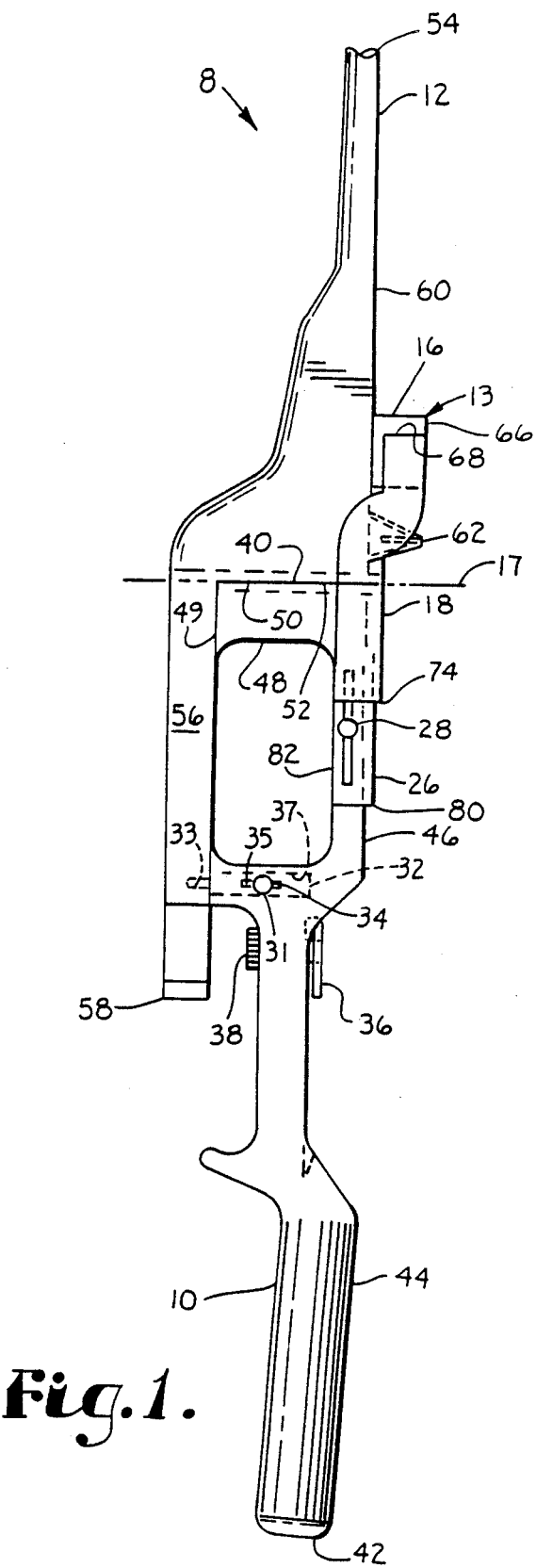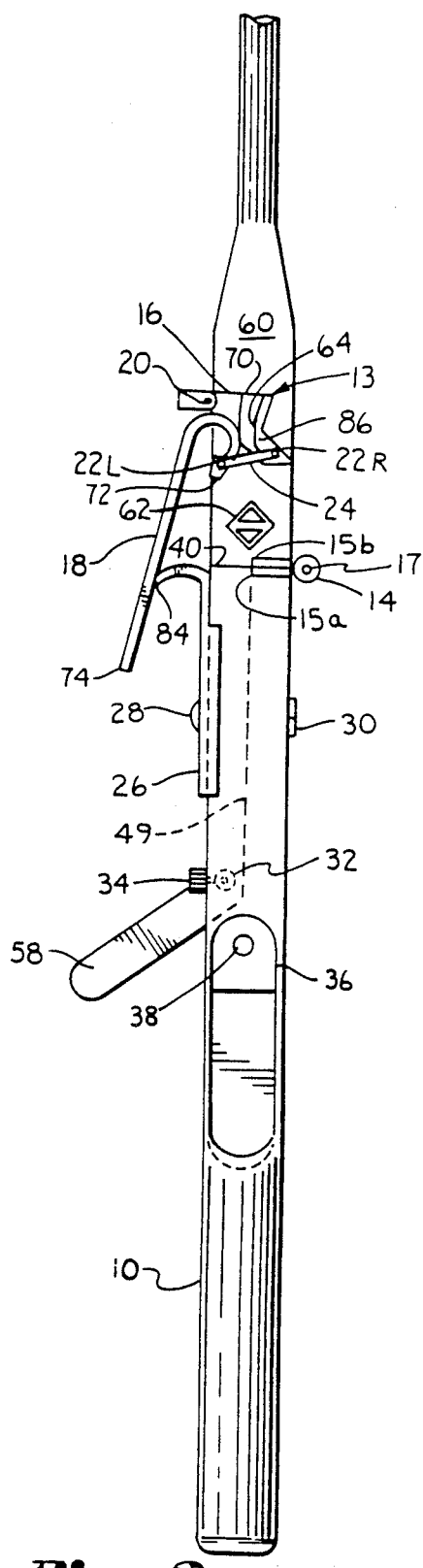

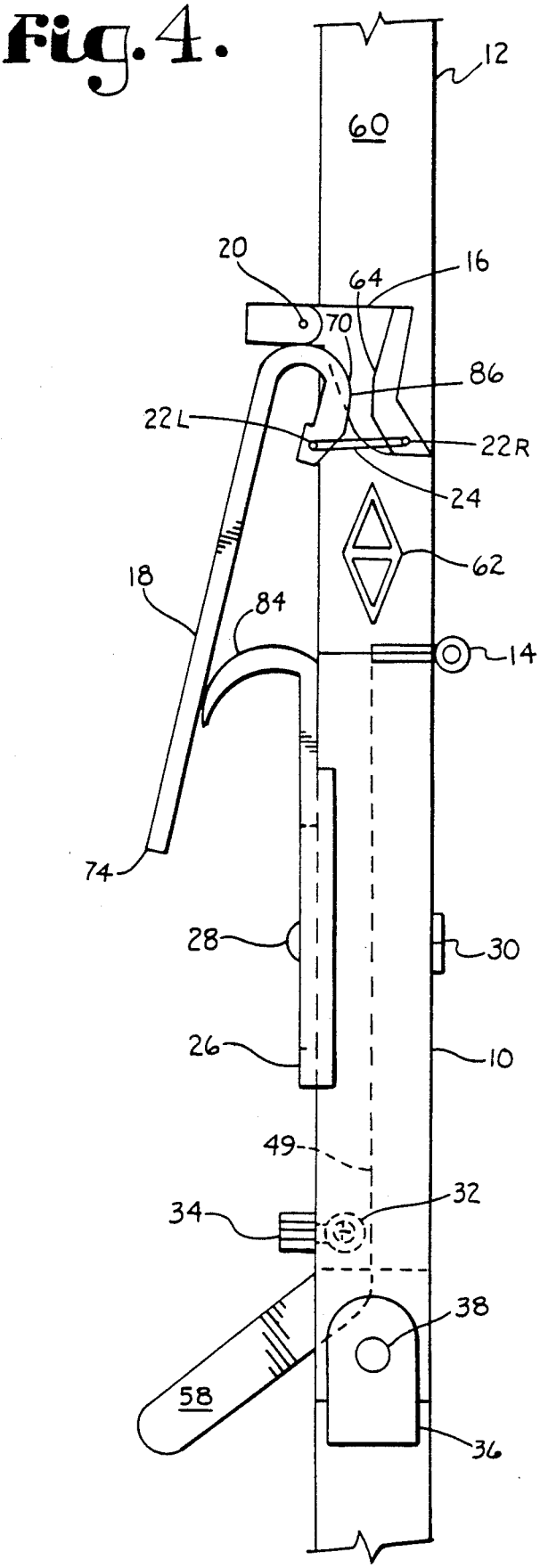

CASTING ROD

BACKGROUND OF THE INVENTION

1. Field of the Invention

The present invention relates generally to sport and recreational fishing equipment, and in particular to a casting rod with an automatic line release mechanism.

2. Description of the Related Art

In sport and recreational fishing, and possibly some commercial fishing, fishing lines are attached to bated hooks and various lures for attracting fish.

The bated hooks and lures are often cast by anglers to locations deemed likely to produce good results. With many types of artificial bates, the lures or flies are repeatedly cast and retrieved to simulate swimming movement of natural prey for the fish. In such casting procedures, accuracy can be relatively important since fish may be located in relatively small areas.

Conventional casting rods are often provided with reels which freely pay out the line and which can be used for retrieving the line. Casting rods have previously been provided which articulate for casting, for example, the rods shown in the James U.S. Pat. No. 2,593,885 and the Worsham U.S. Pat. No. 3,525,174. Casting rods have also been provided with mechanisms for gripping the line and controlling the timing of its release. Such mechanisms are shown in the Kozar U.S. Pat. No. 2,804,711 and the Stephenson U.S. Pat. No. 3,165,855.

Heretofore there has not been available a casting rod with a rod assembly which rotates with respect to a handle assembly for casting and which includes a line release mechanism with the advantages and features of the present invention. The casting rod of the present invention offers significant advantages for casting in relatively crowded conditions and permits casting with relatively little body movement by an angler. Furthermore, casting accuracy can be achieved with the casting rod of the present invention due to its automatic line release mechanism, which can be adjusted for varying the casting placement.

SUMMARY OF THE INVENTION

In the practice of the present invention, a casting or fishing rod is provided which includes handle and rod assemblies rotatably interconnected by a hinge whereby the rod assembly can be swung between a skewed position skewed with respect to the handle assembly and an aligned position in alignment with the handle assembly. A fishing reel can be mounted on the handle assembly. The rod assembly includes a fulcrum whereat the hinge is mounted, a rod shaft extending forwardly from the fulcrum and a lever terminating in a handle extending rearwardly from the fulcrum. A line release mechanism includes fixed and movable jaw members mounted on the rod assembly with line engaging faces forming a line passage therebetween. An actuator is mounted on the handle assembly for engaging the movable jaw member near the end of a cast as the rod assembly is swung from its skewed position to an aligned position thereof. The actuator is linearly adjustable whereby the timing of the line release can be altered for adjusting the aim of the casting rod. A locking mechanism is provided for locking the rod assembly in its aligned position with respect to the handle assembly.

OBJECTS AND ADVANTAGES OF THE INVENTION

The principal objects and advantages of the present invention include: providing a casting or fishing rod; providing such a rod with a line release mechanism which operates automatically upon completing a cast; providing such a rod wherein the line release timing can be adjusted; providing such a rod which can be used in relatively confined places; providing such a rod which requires relatively little body and arm movement by an angler casting with it; providing such a rod which can be fitted with various reels; providing such a rod which can be fitted with various rod shafts; providing such a rod which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a side elevational view of a casting rod embodying the present invention.

FIG. 2 is a top plan view of the casting rod.

FIG. 4 is an enlarged, fragmentary, top plan view of the casting rod, particularly showing the rod assembly thereof in an aligned position.

DETAILED DESCRIPTION OF THE PREFERRED EMBODIMENT

I. Introduction and Environment

Figure 3:
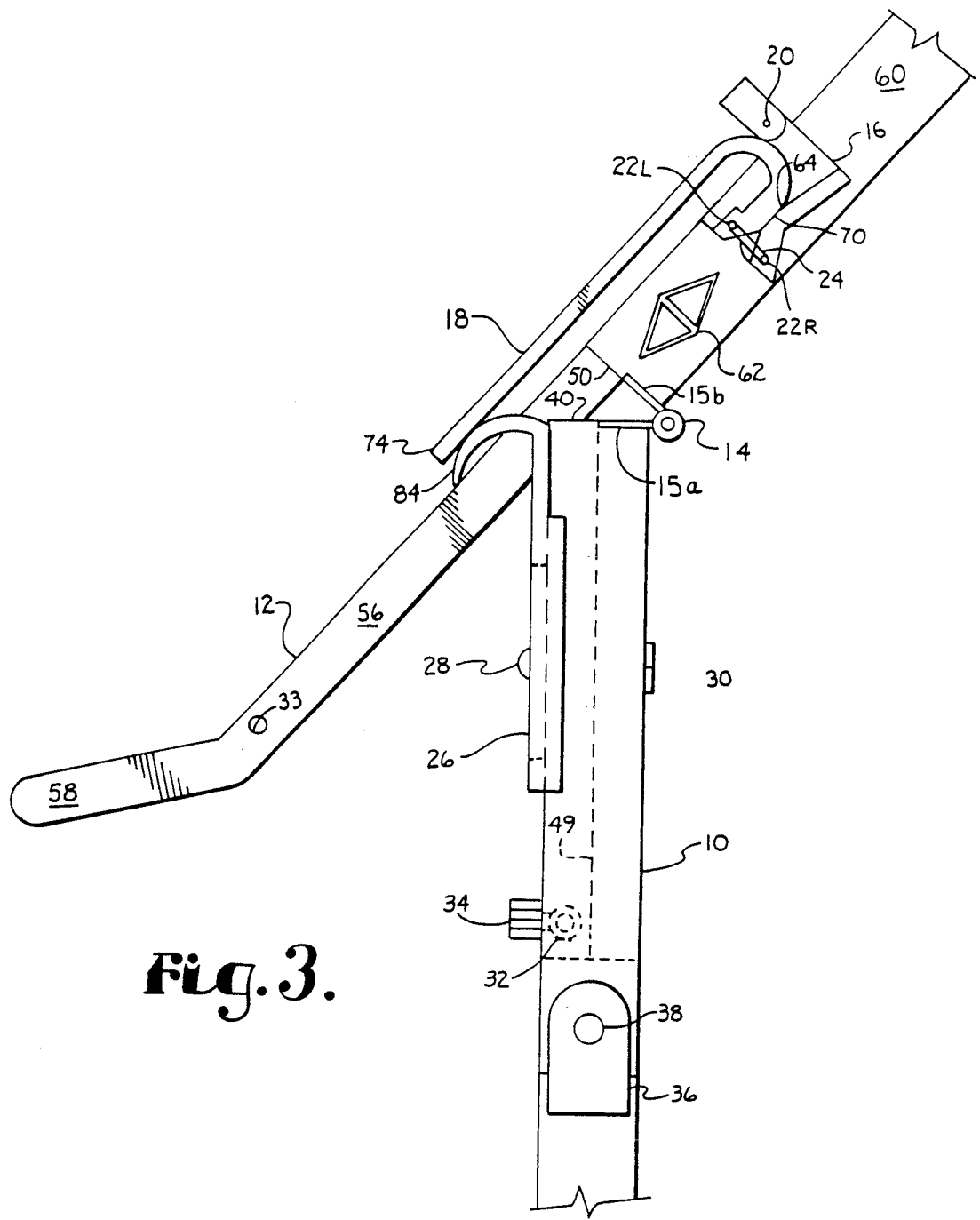
FIG. 3 is an enlarged, fragmentary top plan view of the casting rod, particularly showing a rod assembly thereof in a skewed position.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference 8 generally designates a casting or fishing rod embodying the present invention. The casting rod 8 generally comprises a handle assembly 10, a rod assembly 12 and a line release mechanism 13.

II. Handle Assembly 10

The handle assembly 10 includes a front end 40, a back end 42 and a hand grip 44 positioned adjacent to the back end 42. A handle assembly body 46 is positioned adjacent to the front end 40 and includes a rectangular cutout 48. A reel clamp 36 threadably receives a reel clamp screw 38 and is positioned between the hand grip 44 and the body 46 for mounting a fishing reel (not shown). The handle assembly 10 includes a longitudinally-extending groove 49 below the cutout 48.

A locking mechanism 31 includes a locking pin 32 slidably received in a vertical locking pin bore 37 in the handle assembly body 46. The locking pin 32 can be secured in place with respect to the handle assembly 10 by a locking pin screw 34 which is slidably received in a vertical locking pin screw slot 35 in the handle assembly body 46. The locking pin screw slot 35 communicates with the locking pin bore 37.

III. Rod Assembly 12

The rod assembly 12 includes a fulcrum 50 in the form of a relatively flat, vertical surface 52 generally corresponding to the configuration of the handle assembly front end 40, a rod shaft 54 (which can comprise several sections) extending generally forwardly from the fulcrum 50, and a lever 56 extending generally rearwardly from the fulcrum 50 and terminating at a handle 58 which is angled outwardly and rearwardly with respect to the lever 56. The lever 56 includes an upwardly-open locking pin receiver 33 which aligns with the locking pin bore 37 for receiving the locking pin 32 when the rod assembly 12 is in its aligned position and the locking pin 32 is in its lowered, lock position.

The rod assembly 12 includes an upper edge 60 extending generally forwardly from the fulcrum 50 and mounting a first line guide 62. Additional line guides (not shown) can be mounted on the rod assembly 12 in alignment with the first line guide 62.

A butt-type hinge 14 pivotally interconnects the handle and rod assemblies 10, 12 and includes hinge leaves 15a, 15b mounted on the handle assembly front end 40 and the rod assembly surface 52 respectively. The hinge 14 also includes a generally vertical pivotal axis 17.

IV. Line Release Mechanism 13

The line release mechanism 13 includes a fixed jaw member 16 mounted on the rod assembly upper edge 60. The fixed jaw member 16 includes a fixed line engagement face 64 with a generally vertical orientation and a mounting boss 66 positioned in laterally spaced relation from the fixed line engagement face 64.

A movable jaw assembly 18 includes a front end 68 with a movable line engagement face 70 on a line engagement leg 72 and an actuating leg 74. The movable jaw member legs 72, 74 extend generally rearwardly from the movable jaw member front end 68 in generally parallel, spaced relation whereby the movable jaw member 18 generally has a J-shaped configuration when viewed in plan from above (FIGS. 2, 3 and 4). The movable jaw member 18 is pivotally connected to the fixed jaw member mounting boss 66 by a line release mechanism pivot pin 20 which is oriented generally vertically.

A fixed or right jaw pin 22R and a left or movable jaw pin 22L are mounted on and project upwardly from the fixed and movable jaw members 16, 18 in proximity to their respective line engaging faces 64, 70. Biasing means such as a rubber band 24 or a tension spring (not shown) interconnects the jaw pins 22R, 22L and biases the jaw members 16, 18 towards a clamped position (FIG. 3) of the line release mechanism 13 for clamping a line (not shown) therebetween.

An actuator 26 includes a mounting leg 80 with a slot 82 which receives a mounting screw 28. The mounting screw 28 extends through the handle assembly body 46 above the cutout 48 and threadably receives a nut 30 on the other side of the body 46 from the actuator 26. The screw 28 and the nut 30 can be loosened for longitudinally sliding the actuator 26, and can be tightened for clamping it in position on the handle assembly body 46.

An actuator cam leg 84 extends outwardly from the actuator mounting leg 80 and has a top plan configuration generally comprising an arc curving generally outwardly and rearwardly whereby the cam leg 84 is forwardly-convex and rearwardly-concave.

v. Operation

In operation, a reel (not shown) can be mounted on the handle assembly 10 with the reel clamp 36 and secured with the reel clamp screw 38. Line (not shown) from the reel can be threaded through the first line guide 62 and through a line passage 86 formed between the line engagement faces 64, 70.

With the rod assembly 12 in an aligned position thereof (FIGS. 1, 2 and 4), the actuator cam leg 84 engages the movable jaw member actuating leg 74 whereby the line release mechanism 13 is in a release position thereof with the line passage 86 at its greatest width. In this configuration, the line can slide freely through the line passage 86.

The rod assembly 12 can be secured by lowering the locking pin 32 into the receiver 33. The locking pin 32 can be secured in place by tightening the locking pin screw 34.

For casting, the locking mechanism 31 is released by raising the locking pin 32 out of the receiver 33 whereby the rod assembly 12 is free to swing about the pivotal axis 17 with respect to the handle assembly 10. With the locking mechanism 31 in its unlock position, the rod assembly 12 can be swung to a skewed position thereof by grasping the handle 58. For example, an angler can hold the hand grip 44 in his or her right hand and can grasp the handle 58 with his or her left hand for swinging the rod assembly 12.

The rod assembly 12 can be swung through an arc of up to approximately 180 degrees between its maximum skewed position and its aligned position. FIG. 3 shows the rod assembly 12 in a skewed position rotated approximately 42 degrees from its aligned position. The angler can cast with the casting rod 8 by bringing the rod assembly 12 back to its aligned position. The distance of the cast can be controlled by varying the force with which the assembly 12 is swung.

Through much of the casting swing, the line release mechanism 13 will remain in a clamp position thereof until the rod assembly 12 reaches a position whereat the movable jaw member actuating leg 74 engages the actuator cam leg 84, whereupon the movable jaw member 18 will rotate to place the line release mechanism 13 in a release position thereof with the line passage 86 slightly widened. The line is thereby released for passing freely through the first line guide 62, the line passage 86, and along the rod assembly upper edge 60.

The actuator 26 can be longitudinally adjusted on the handle assembly 10 by loosening the screw 28 and the nut 30 whereby the line release timing can be adjusted. For example, by sliding the actuator 26 forwardly, the actuating leg 74 will engage the cam leg 84 at a greater skewed angle of the rod assembly 12 for line release earlier in the casting stroke. Conversely, sliding the actuator 26 rearwardly delays the line release.

With the handle assembly 10 oriented in substantially the same direction for multiple casts, advancing the line release timing will generally move the cast to the right (for a right-hand casting rod 8 as shown in FIGS. 1-4) and delaying the line release timing will generally move the cast to the left. Thus, with practice an angler can achieve relatively consistent and accurate casting. With the adjustable release feature of the line release mechanism, an angler can relatively consistently place casts approximately where the handle assembly 10 is pointed.

The casting rod 10 also offers advantages in relatively crowded conditions since the swinging arc of the rod assembly can be relatively limited, and since the casting rod 8 requires relatively little arm and body movement by the angler for casting.

By swinging the rod assembly 12 through an arc of approximately 180 degrees whereby the casting rod 8 is essentially folded double, a relatively compact storage configuration is provided, particularly by removing the rod shaft 54 or sections thereof.

The handle assembly groove 49 receives the rod assembly lever 56 with the rod assembly 12 in its aligned position. With the rod assembly 12 in its aligned position, an angler can place his or her hand around the lever 56 and partly within the cutout 48, for comfortably holding the casting rod 8 with relatively good balance.

It is to be understood that while certain forms of the present invention have been illustrated and described herein, it is not to be limited to the specific forms or arrangement of parts described and shown.

What is claimed and desired to be secured by Letters Patent is as follows:

1. A casting rod, which includes:
   (a) a handle assembly with front and back ends and a hand grip located adjacent to the back end;
   (b) a rod assembly with a fulcrum, a rod shaft extending generally forwardly from the fulcrum and a lever extending generally rearwardly from the fulcrum;
   (c) a hinge connected to said handle assembly front end and said rod assembly fulcrum;
   (d) said rod assembly having an aligned position generally aligned with said handle assembly and a skewed position skewed with respect to said handle assembly, said rod being swingable between its aligned and skewed positions about said hinge; and
   (e) a line release mechanism, which includes:
      (1) a fixed jaw member mounted on said rod assembly in proximity to the fulcrum thereof;
      (2) a movable jaw member having front and back ends, said movable jaw member front end being pivotally connected to said fixed jaw member;
      (3) said movable jaw member being swingable between a clamp position in clamping relation with respect to said fixed jaw member and a release position;
      (4) said fixed jaw member having a fixed line engagement face and said movable jaw member having a movable line engagement face;
      (5) a line passage between said line engagement faces, said line passage being narrower with said movable jaw member in its clamp position and wider with said movable jaw member in its release position; and
      (6) an actuator mounted on said handle assembly in proximity to the front end thereof and selectively engaging said movable jaw member in proximity to the back end thereof with said rod assembly in its aligned position.

2. The invention of claim 1, which includes:
   (a) biasing means for biasing said movable jaw member to the clamp position thereof.

3. The invention of claim 2 wherein said biasing means comprises:
   (a) a rubber band attached to said fixed and movable jaw members.

4. The invention of claim 1 wherein said actuator is longitudinally adjustably mounted on said handle assembly.

5. The invention of claim 1, which includes:
   (a) a line guide mounted on said rod assembly between said release mechanism and said fulcrum.

6. The invention of claim 1, wherein:
   (a) said hinge comprises a butt hinge with a pair of leaves each mounted on one of said handle assembly front end and said rod assembly adjacent to the fulcrum thereof.

7. The invention of claim 1, which includes:
   (a) a locking pin slidably mounted in said handle assembly and slidable between a lock position extending into said rod assembly with said rod assembly in its aligned position and an unlock release position.

8. A casting rod, which includes:
   (a) a handle assembly including:
      (1) a front end;
      (2) a back end;
      (3) a hand grip adjacent to the back end;
      (4) a body adjacent to said handle assembly front end and including a cutout and a groove located below said cutout; and
      (5) a locking mechanism including a locking pin bore extending generally vertically in said handle assembly body, a locking pin vertically slidably received in said locking pin bore and vertically slidable between a raised unlock position and a lowered lock position, a locking pin slot in said body communicating with said locking pin bore and a locking pin set screw threadably received in said locking pin and slidably received in said locking pin slot;
   (b) a rod assembly including:
      (1) a fulcrum;
      (2) a generally flat, vertical surface at said fulcrum;
      (3) a rod shaft extending generally forwardly from said fulcrum;
      (4) a lever extending generally rearwardly from said fulcrum and terminating in a handle angled generally outwardly and rearwardly from said fulcrum;
      (5) an upper edge extending generally forwardly from said fulcrum; and
      (6) a line guide mounted on top of said upper edge in front of said fulcrum;
   (c) a line release mechanism including:
      (1) a fixed jaw member mounted on top of said rod assembly upper edge and including a fixed line engaging face and a mounting boss;

(2) a movable jaw member with a front end pivotally connected to said fixed jaw member mounting boss, a line engagement leg extending generally rearwardly from said movable jaw member front end and including a movable line engagement face, and an actuating leg extending generally rearwardly from said movable jaw member front end;
(3) a line passage between said line engagement faces;
(4) said movable jaw member being rotatable between a clamp position with said line passage relatively narrow and a release position with said line passage relatively wide;
(5) tension return means connected to said jaw members for biasing said movable jaw member towards its clamp position; and
(6) an actuator including a mounting leg with a slot, an actuator set screw extending through said mounting leg slot and through said handle assembly body, a nut threadably received on said actuator set screw, and a cam leg extending generally outwardly from said mounting leg;
(d) a butt-type hinge including a pair of leaves each mounted on one of said rod assembly surface and said handle assembly front end;
(e) said rod assembly being swingable about said hinge with respect to said handle assembly between an aligned position generally aligned with said handle assembly and a skewed position generally skewed with respect to said handle assembly; said cam leg engaging said actuating leg with said rod assembly in its aligned position whereby said movable jaw member is maintained in its release position; and
(f) a locking pin receiver in said rod assembly lever for receiving said locking pin in a lock position thereof.

* * * * *